United States Patent [19]
Porter

[11] Patent Number: 6,030,526
[45] Date of Patent: *Feb. 29, 2000

[54] WATER TREATMENT AND PURIFICATION

[75] Inventor: James H. Porter, Vineyard Haven, Mass.

[73] Assignee: UV Technologies, Inc., Somerville, Mass.

[*] Notice: This patent issued on a continued prosecution application filed under 37 CFR 1.53(d), and is subject to the twenty year patent term provisions of 35 U.S.C. 154(a)(2).

[21] Appl. No.: 08/777,622

[22] Filed: Dec. 31, 1996

[51] Int. Cl.[7] ................................. C02F 1/32; C02F 1/78
[52] U.S. Cl. ....................... 210/198.1; 210/205; 210/209; 210/908; 422/186.3
[58] Field of Search .................................. 210/748, 759, 210/760, 198.1, 205, 209, 908; 422/24, 186, 186.3; 250/432 R, 436

[56] References Cited

U.S. PATENT DOCUMENTS

| | | | |
|---|---|---|---|
| 4,141,830 | 2/1979 | Last | 210/748 |
| 4,892,712 | 1/1990 | Robertson et al. | 422/186 |
| 5,035,784 | 7/1991 | Anderson et al. | 210/748 |
| 5,069,885 | 12/1991 | Ritchie | 210/748 |
| 5,266,215 | 11/1993 | Engelhard | 210/748 |
| 5,288,461 | 2/1994 | Gray | 422/24 |
| 5,462,674 | 10/1995 | Butters et al. | 210/748 |
| 5,540,848 | 7/1996 | Engelhard | 210/748 |

FOREIGN PATENT DOCUMENTS

WO 95/03261  2/1995  WIPO.

*Primary Examiner*—David A. Simmons
*Assistant Examiner*—Betsey J. Morrison
*Attorney, Agent, or Firm*—Hale and Dorr LLP

[57] ABSTRACT

A water treatment system that a pair of series connected reactor vessels, each of which provides for flow of water to be treated through an annular treatment region that surrounds a longitudinally-extending source of ultraviolet radiation, has porous wall surrounding the annular treatment region, and an annular air/oxygen chamber between the porous wall and the exterior of the vessel. In one reactor, the ultraviolet source produces radiation having a wavelength in the range of about 185 nanometers, oxygen permeates through the porous wall as a fine bubble mist, the tangential aqueous stream shears the mist from the wall, the oxygen bubbles encounter UV light, and the oxygen is converted to ozone which in turn reacts with water in the water to produce hydrogen peroxide. In the other reactor, a layer of particulate anatase titanium dioxide is deposited on the interior surface of the porous wall, oxygen from the air/oxygen chamber is bubbled through the titanium dioxide layer into the circumstantially outer portion of the annular treatment region, and UV light activates the titanium dioxide to provide ionized dissolved oxygen in the outer portion of the annular treatment region.

8 Claims, 4 Drawing Sheets

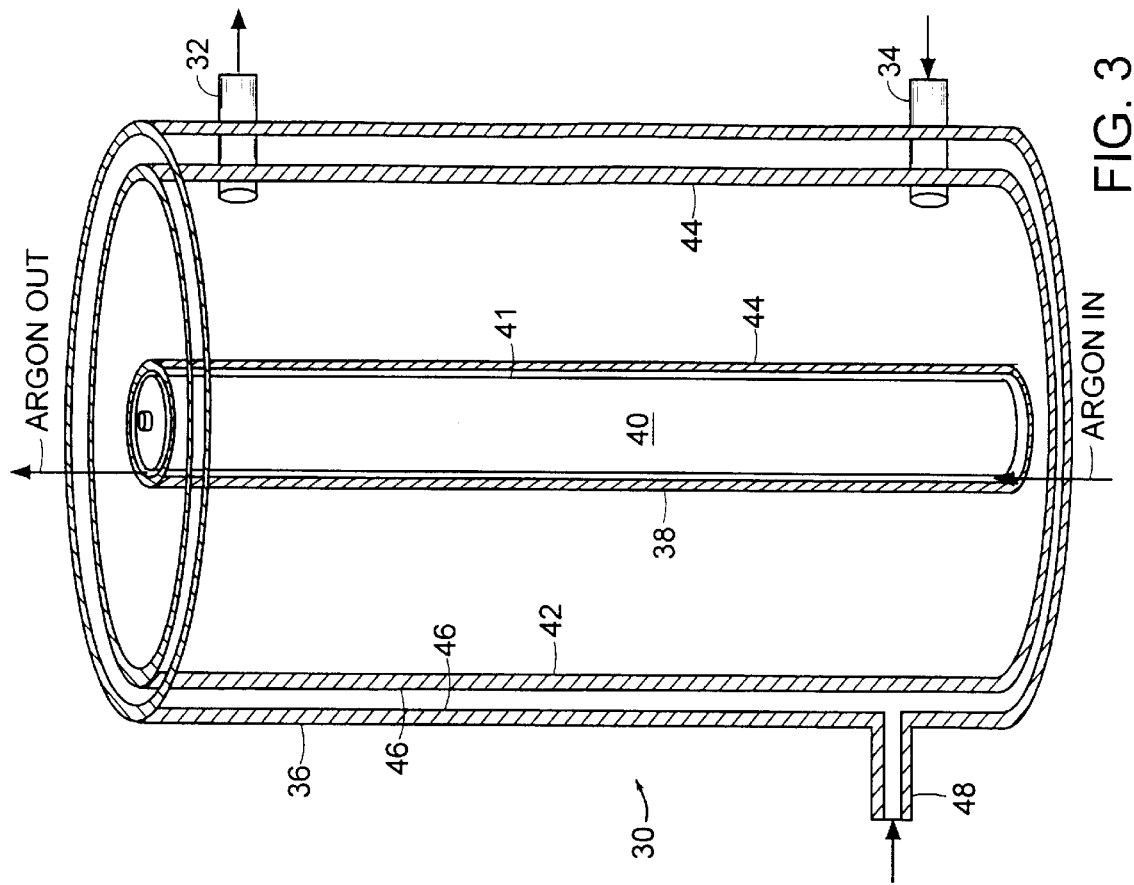
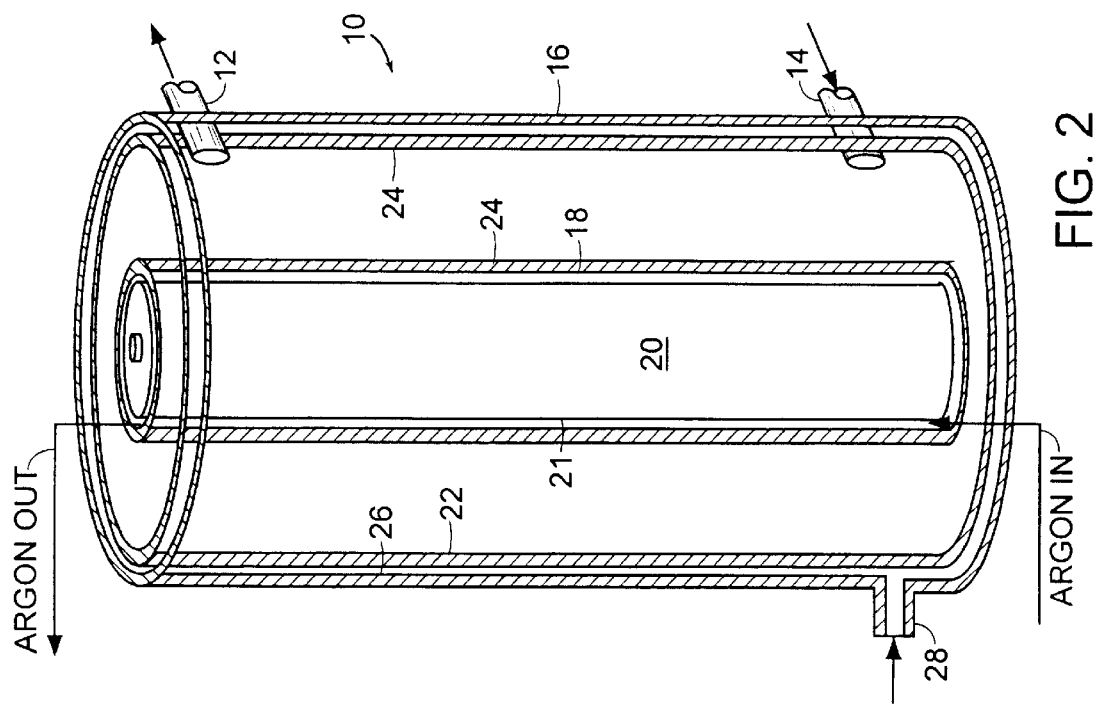

WATER TREATMENT AND PURIFICATION

FIELD OF THE INVENTION

This invention relates to water treatment and purification and, more particularly, to methods and apparatus for treating water containing hydrocarbon waste.

BACKGROUND OF THE INVENTION

Unsaturated hydrocarbons are a significant contaminant in ground water and a variety of industrial waste solutions. A large number of systems and methods have been proposed for reacting or otherwise eliminating various types of contaminants.

For example, in recent years UV-peroxide and ozone systems have become a treatment of preference for removal of toxic organics in waste water because such systems chemically convert contaminant species to benign components. Published PCT application PCT/US94/07983, in which applicant is an inventor and which is hereby incorporated by reference, discloses systems in which hydrogen peroxide is added to the waste solution and is subjected to ultraviolet irradiation either before or after it is so added, and in which the waste is treated in a reactor coated with a photocatalyst such as titanium oxide.

However, hydrogen peroxide is relatively expensive, the cost becomes a significant consideration particularly as contaminant concentrations increase. Further, the rate of contaminant oxidation depends on the ability of peroxide to absorb UV light and to dissociate into hydroxyl radicals. UV light intensity diminishes with distance from the light source, and reactor size thus has been limited since reactors with radii larger than a critical dimension to not achieve their decontamination goals.

There remains a need for less expensive systems that can treat greater volumes of waste water containing higher concentrations of hydrocarbon waste.

SUMMARY OF THE INVENTION

The invention provides a water treatment system that features both a reactor vessel providing for flow of water to be treated through an annular treatment region that surrounds a longitudinally-extending source of ultraviolet radiation, porous wall surrounding the annular treatment region, and an annular air/oxygen chamber between the porous wall and the exterior of the vessel. Preferably, tangential flow inlets and outlets are provided adjacent opposite ends of the annular treatment region, and an air/oxygen inlet is provided adjacent an end of the air/oxygen chamber.

In one preferred aspect of the invention, the ultraviolet source produces radiation having a wavelength in the range of about 185 nanometers. Oxygen permeates through the porous wall as a fine bubble mist. The tangential aqueous stream shears the mist from the wall, the oxygen bubbles encounter UV light, and the oxygen is converted to ozone which in turn reacts with water to produce hydrogen peroxide in the water.

In another preferred aspect, a layer of particulate anatase titanium dioxide is deposited on the interior surface of the porous wall, oxygen from the air/oxygen chamber is bubbled through the titanium dioxide layer into the circumstantially outer portion of the annular treatment region, and UV light activates the titanium dioxide to provide ionized dissolved oxygen in the outer portion of the annular treatment region.

In most preferred aspects, the system includes at least two of such reactors connected in series so that hydrogen peroxide produced by one reactor is introduced into the waste water stream that flows into the second reactor.

DESCRIPTION OF DRAWINGS

FIG. 2 is a sectional view of the oxygen production reactor of the system of FIG. 1.

FIG. 3 is a sectional view of the toxic reduction reactor of the system of FIG. 1.

DETAILED DESCRIPTION

Figure 1:
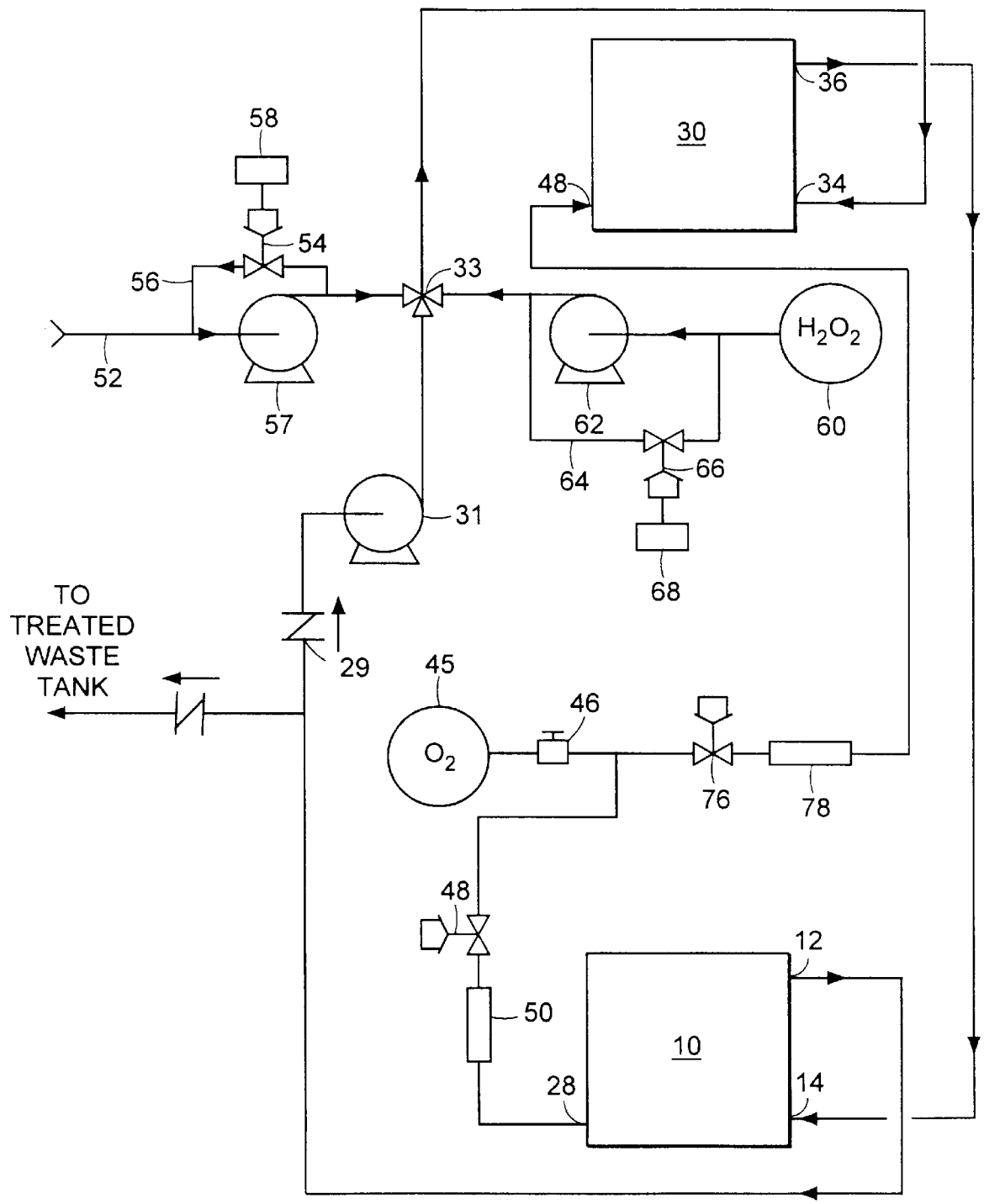
FIG. 1 is a schematic of a waste treatment system embodying the present invention.

Referring now to FIGS. 1 through 3, a water treatment system includes an oxidant production reactor 10 having its outlet 12 connected to the inlet 34 of a toxic reduction reactor 30. As described in more detail below, each of the reactors includes a cylindrical outer wall, designated 16, 36, respectively, a cylindrical housing, designated 18, 38, made of suprasil quartz or any suitable material capable of transmitting the emitted light surrounding a central axially extending UV lamp, designated 20, 40 respectively, and a porous stainless steel cylindrical wall, designated 22, 42 having a radius slightly less than that of the respective housing 18, 38. A tangential flow inlet 14, 34 is provided at one end of each housing for introducing a liquid flow tangentially into the annular flow chamber 24, 44 between the respective porous wall 22, 42 and lamp housing 18, 38. At the other end of each housing is a tangential outlet 12, 32 from the respective flow chamber 24, 44. A second annular chamber 26, 46 having a respective inlet 28, 48 is provided between the respective porous wall 22, 42 and the outer wall 16, 36 of the reactor.

With particular reference to FIG. 2, the lamp 20 of oxidant production reactor 10 is a low intensity (120 watt, about 4 watts per inch), low pressure mercury UV lamp, having an overall efficiency of 30% to 40%. It is desirable that one major wavelength of light emitted by lamp 20 be neither less than about 175 nanometers (to avoid water absorption) nor more than about 200 nanometers (to provide the desired photochemical reactions. By reducing the mercury vapor pressure in the lamp, an about 185 nanometer (e.g., a 184.9 nm) output may be generated at 10% conversion efficiency, with the remaining 20% to 30% of the output emitted at 254 nm. The outer envelope of the lamp itself, and also lamp housing 18, are made of supracil quartz which will transmit the about 185 nm component. The gap 21 between the lamp 20 and lamp housing 18 is flushed with argon. The use of argon rather than air in the gap prevents absorption of the about 185 nm component of the UV light.

Porous wall 22 is sintered stainless steel or other suitable non-reactive sintered material with approximately 0.5 to 3 micron pores extending generally radially therethrough. Optionally, and as discussed in more detail with respect to the toxic reduction reactor 30, the interior surface of the porous wall may be coated with a layer of lightly sintered anatase phase titanium dioxide.

Referring now to FIG. 3, the lamp 30 of reactor 30 is a high pressure, high intensity mercury lamp, producing up to 400 watts per inch of lamp length. The wavelength of UV light emitted by lamp 30 is primarily about 254 nm, with some further emission in the range of 300–400 nm. As discussed hereinafter, it has been found that the fraction above 300 nanometers excites titania, while the about 254 nanometer fraction is effective in dissociating hydrogen peroxide in the bulk fluid phase. The use of mercury at high pressure in the lamp results in very little 185 nm light being generated. The envelope of lamp 30 and lamp housing 28 are both quartz, but need not be suprasil quartz. As in reactor 10, the gap 41 between the lamp 40 and lamp housing 38 is flushed with argon.

The inner cylindrical surface of porous wall 42 is covered with a thin layer of anatase titania particles (mean particle size 0.3 to about 1.0 microns) that are lightly sintered to hold the particles in place while maintaining a large surface area per unit mass.

Referring again to FIG. 1, water (from either a fresh water source 42 or from reactor 30) flows into reactor 10 through tangential inlet 14, and exits from the reactor through tangential outlet 12. The inlet flow rate is established to maintain turbulent flow in both reactor 30 and also reactor 10, and the tangential flow produces a swirling flow in the confined annular flow chamber 24. Oxygen from oxygen source 45 flows under modest pressure (p<6 atm) through a pressure valve 46, motor-controlled valve 48 and flow meter 50 into the annular chamber 26 between the reactor outer wall 16 and porous wall 22. The pressurized gas passes through the porous wall 20 and exits into flow chamber 24 in the form of small bubbles, e.g., 20 to 120 microns in diameter with a mean diameter of about 80 microns. At the inner surface of porous wall 22, the swirling flow shears the bubbles from the wall, producing micron-sized bubbles in suspension. The bubble size is controlled by the shear rate, the higher the shear rate the smaller the bubble size. The centrifugal action of the swirling flow drives the denser liquid phase in flow chamber 24 towards the outer porous wall 22, while the lighter bubble phase passes inwardly towards lamp 20, i.e., towards a region of high intensity UV light.

The oxygen within the bubbles diffuses towards the bubble-water interface, where the oxygen is irradiated and converted to ozone according to the following reaction:

$$3O_2 \overset{h\nu}{=} 2O_3$$

The ozone ($O_3$) in turn reacts with the water in chamber 64 to form hydrogen peroxide ($H_2O_2$):

$$O_3 + H_2O = O_2 + H_2O_2.$$

The hydrogen peroxide dissolves in the water in chamber 64, and the oxygen is further irradiated to form more ozone.

Because oxygen's light absorption coefficient increases with decreasing wavelength, it is desirable to use ultraviolet light having a wavelength less than 200 nm to convert the oxygen to ozone. However, and as previously indicated, the wavelength should not be less than about 170 nanometers because the water absorbs such shorter wavelengths. It has been found that the reactions at the bubble interface are rapid, and that the oxygen diffusion rate in the air bubble is the limiting factor. Thus, small bubble size is also a key to rapid reaction rates.

The water-hydrogen peroxide solution thus-produced exits from reactor 10 through tangential outlet 12 and passes through a check valve 29 to a recycle pump 31 which in turn causes the stream to pass through an in-line mixer 33 and then into reactor 30 through tangential inlet 34. It is the flow rate set by recycle pump 31 that establishes the total flow rate, shear rate, and turbulence in the reactor. In circumstances in which the output from reactor 10 is not itself a waste stream with a high concentration of hydrocarbon contaminants, the flow from reactor 10 is mixed (at in-line mixer 33) with a contaminated aqueous waste stream 52, and the combined stream is forced into the tangential inlet 34 of reactor 30. A motor operated valve 54 in a return line 56 in parallel with feed pump 57 is connected to a controller 58 to assist in adjusting the make-up of the stream introduced into the reactor from mixer 33.

If the level of hydrogen peroxide in the stream from reactor 10 is too low, additional make-up hydrogen peroxide from a storage tank 60 is provided by a peroxide pump 62. Parallel, return flow line 64, motor valve 66 and controller 68 permit the amount of flow of hydrogen peroxide tank 60 to be metered as desired.

In annular flow chamber of reactor 30, ultraviolet light from lamp 40 is absorbed by the hydrogen peroxide in the waste stream, causing the hydrogen peroxide to dissociate into two OH radicals:

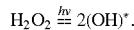

$$H_2O_2 \overset{h\nu}{=} 2(OH)^*.$$

The OH* radicals in turn react with and oxidize the hydrocarbon contaminant R in the waste stream:

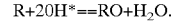

$$R + 2OH^* = RO + H_2O.$$

The rate of contaminant oxidation depends on the ability of peroxide to absorb UV light and dissociate into hydroxyl radicals, which are the principal oxidant in the system. The intensity of UV light decreases rapidly with distance (radially outwardly in reactor 30) from lamp 40, both because of radial spreading of the light and because of light absorption by competitive species. Thus, there is a first critical radius beyond which the rate of contaminant oxidation becomes less than that required to achieve a target level of overall decontamination by the time the aqueous fluid in annular flow chamber 44 reaches outlet 32. Since the level of decontamination is greatest near the lamp, the radius of the annular flow chamber 44 may be extended somewhat beyond this first critical radius without the integrated decontamination of all the fluid in the flow chamber 44 falling below the target level. Beyond a second critical radius, however, reactors do not achieve their decontamination goals.

In reactor 30, the reaction rate, particularly at distances beyond the first critical radius, is enhanced, and the second critical radius is thus increased to a radius not less than that of porous wall 42. A significant portion of the UV spectrum emitted by lamp 40 is emitted at wavelengths longer than 250 nm. At these wavelengths, the emitted light activates the titania on the inner surface of wall 42, causing electrons to transfer from the valence band to the conducting band, leaving the conducting band with a slight positive hole. Organics absorbed on the titania in the vicinity of such a hole serve as electron donors; and oxidants absorbed in the vicinity of the conduction band electrons become electron acceptors. As a result, the oxidants are reduced and the organics oxidized, at a rate which depends on (a) the rate at which photons transfer electrons from the valence band to the conduction band, and (b) the rate at which reactants will absorb on the photocatalyst surface. It has been found that sufficient UV light having a wavelength greater than 255 nm is not absorbed in the path between lamp 40 and the titania inner surface of porous wall 42. Although the intensity of the UV radiation diminishes significantly with distance from the lamp 40, the photon energy remains essentially unchanged and in sufficient to transfer valence band electrons to the conduction band. It has also been found that small, lightly-sintered titania particles provide a desirably large surface area per unit mass (e.g., at least 50 $m^2$/gram of sintered titania, or 0.002 $m^2$/cm2 of the inner cylindrical surface of wall 42).

The oxidation rate of the contaminant in the region near wall 22 is further increased by oxygen permeation through the microporous sintered titania structure. Oxygen from oxygen source 44 flows under pressure through pressure control valve 46, motor-operated flow control valve 76 and flow meter 78 into the annular chamber 46 between the outer wall 36 of reactor 10 and porous wall 22. The oxygen permeates the titania structure, absorbs on the lighted (i.e., inner) side of the titania, and provides an additional oxidant in the vicinity of the porous wall 42.

The treated (i.e., oxidized) contaminant stream exiting from reactor 30 through outlet 34 may flow directly to a treated waste tank if the total TOC has been reduced to desired levels. More typically, and as shown in FIG. 1, it is recycled to the inlet of reactor 10 and upon exiting reactor 10 is (depending on the level of remaining contaminants) either directed to a treated waste tank or recycled through toxic reduction reactor 30.

It will be recognized that both reactor 10 (with or without a sintered titania layer on the inner surface of its porous wall 22) and reactor 30 may be useful alone, in addition to being used together in a system as previously described.

Figure 4:
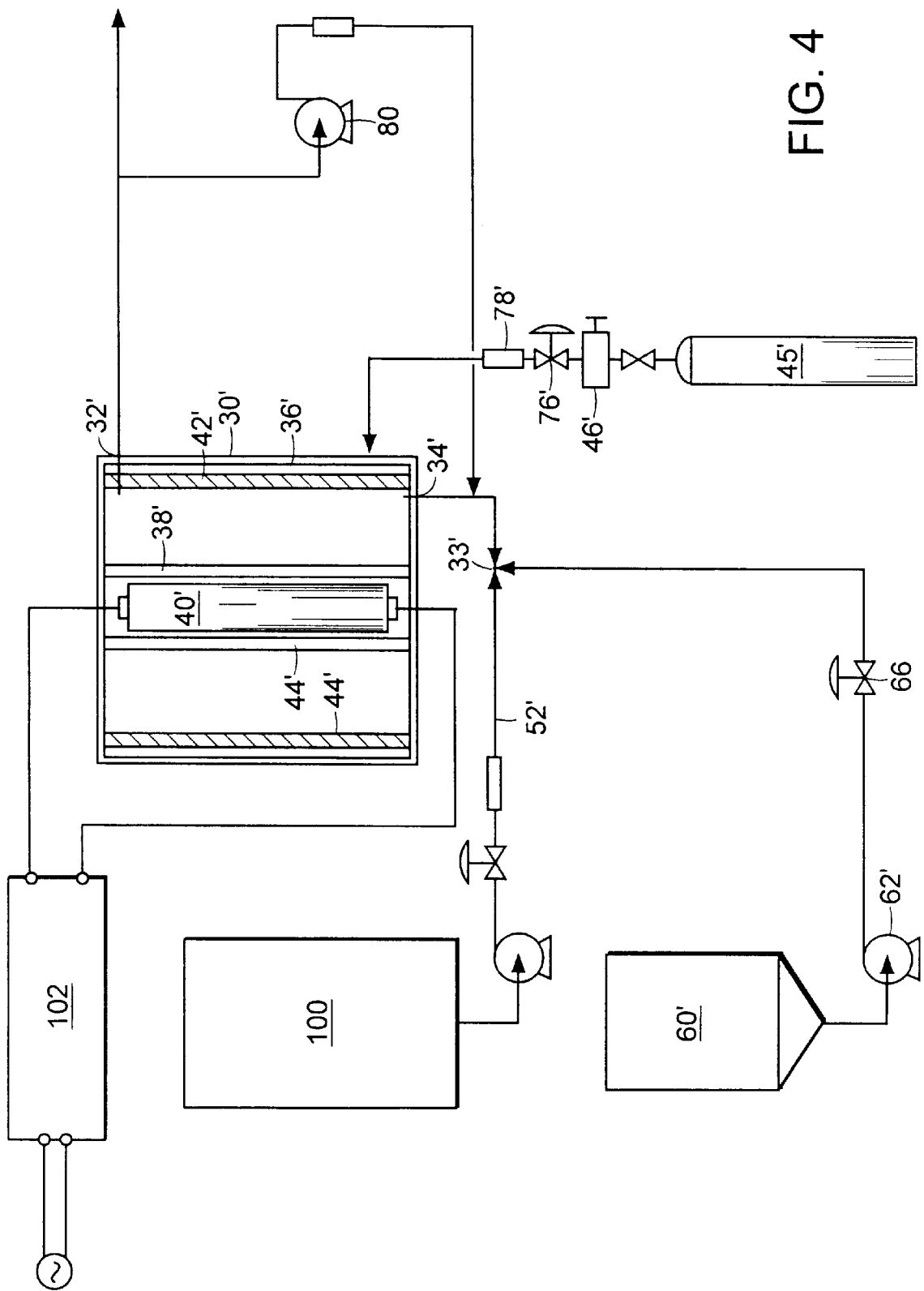
FIG. 4 is a schematic of a second waste treatment system embodying the present invention.

In situations in which the cost of hydrogen peroxide is relatively unimportant, a toxic reduction reactor such as reactor 30 may be part of a stand-alone system, such as that illustrated in FIG. 4. In FIG. 4, components essentially identical to those of the system of FIG. 1 are identified by the same reference numbers, with a differentiating prime (') added. Thus, in the system of FIG. 4, hydrogen peroxide from source 60' is mixed with a contaminated waste stream 52' from tank 100 at inline mixer 33', and the mixed stream is introduced into inlet 34' of reactor 30'. The treated stream exiting from outlet 32' is either recycled by recycle pump 80, or is discharged to a treated waste tank (not shown). Power for lamp 40' is provided by power source 102.

Figure 5:
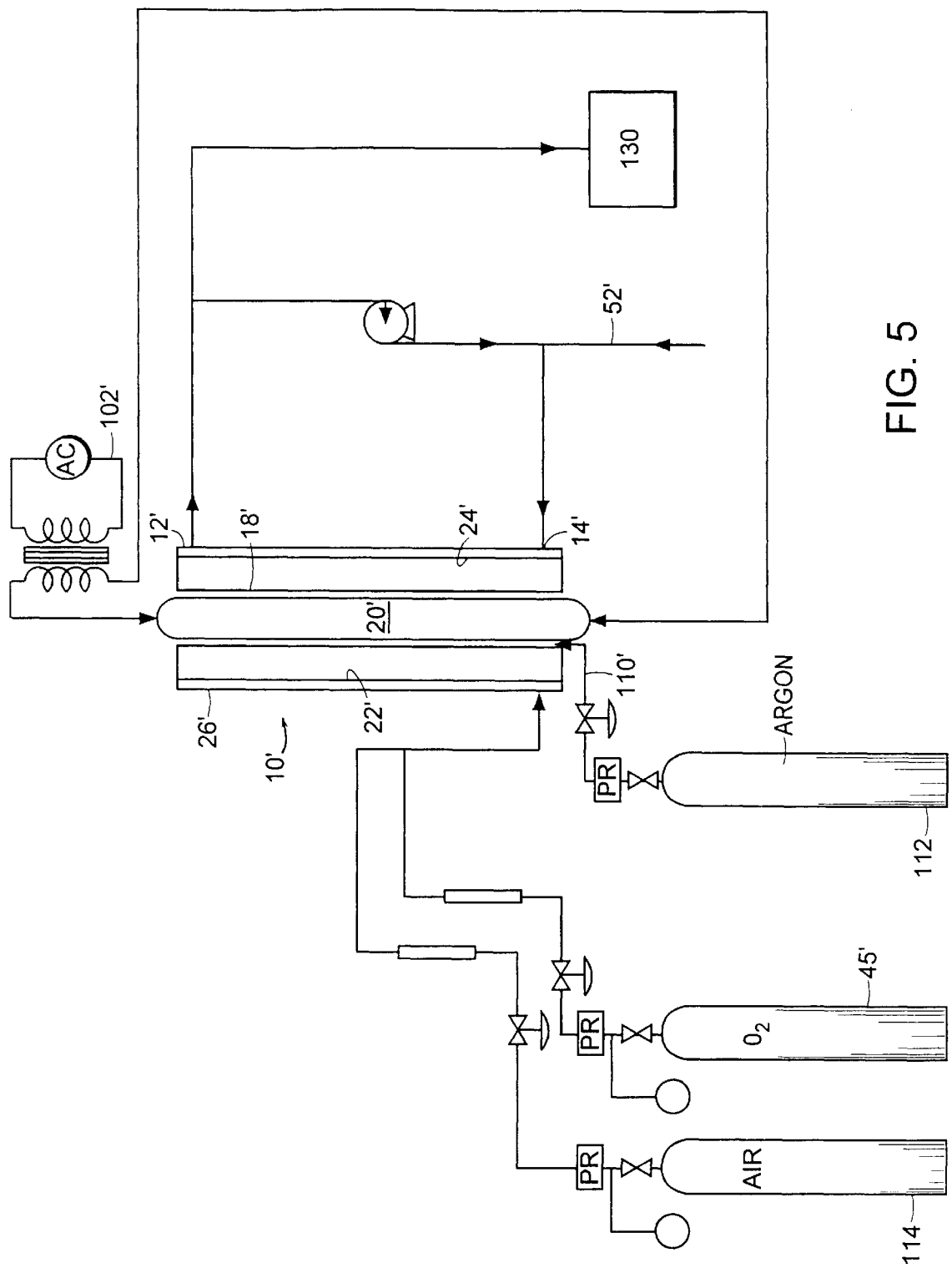
FIG. 5 is a schematic of a third waste treatment system embodying the invention.

Similarly, FIG. 5 shows a system based on a reactor such as reactor 10 and including several components essentially identical to those of the system of FIG. 1 and identified by the same reference numbers, with a differentiating prime (') added. In the system of FIG. 5, an argon feed 110 from argon source 112 passes between lamp 20' and the supracil lamp housing 18'; and an air/oxygen mix from air source 114 and oxygen source 45' is provided under pressure to the annular chamber 26' between porous wall 22' and the exterior wall of the reactor 10'. As in the system of FIG. 1, the approximately 185 nm ultraviolet light from lamp converts oxygen bubbles permeating inwardly from porous wall 22' into ozone; the ozone reacts with water in the flow chamber 24' of reactor 10' to form hydrogen peroxide; and the longer wavelength ultraviolet energy from the lamp causes the hydrogen peroxide to dissociate into OH radicals which in turn reacts with and oxidizes hydrocarbon contaminants in the flow chamber 24'.

Contaminated water from waste stream 52' is recycled through the reactor 10' until, as a result of reactions between the hydrocarbon contaminants and the OH radicals, the concentration of hydrocarbon contaminants in the waste stream has been reduced to the desirable level, at which point the treated stream is discharged into treated water tank 130.

What is claimed is:

1. In the method of treating waste water containing hydrocarbon contaminants in a reactor including a longitudinally extending source of ultraviolet radiation having a wavelength in the range of about 185 nanometers within the reactor, that improvement comprising the steps of:

providing a gas which is substantially air or oxygen producing small bubbles of the gas;

mixing the bubbles with the flow of waste water in the reactor;

causing said source to produce said radiation having said wavelength; and subjecting the bubbles mixed with the waste water to said radiation in said wavelength, said radiation being produced substantially continuously for a period of time sufficient to convert oxygen of said bubbles into ozone in the presence of the contaminants in the waste water.

2. The method of claim 1 wherein said radiation source also produces radiation having a wavelength in the range of about 254 nanometers, and including the step of simultaneously producing, and subjecting said wastewater in said reactor to, radiation in both of said wavelengths.

3. The method of claim 1 wherein said bubbles are oxygen bubbles.

4. The method of claim 1 wherein said bubbles have a diameter in the range of about 20 to about 120 microns.

5. The method of claim 1 wherein said reactor has a porous wall having a plurality of pores extending therethrough, and wherein said bubbles are produced by flowing said gas from an air/oxygen chamber through the pores of said porous wall.

6. The method of claim 1 wherein the waste water is introduced tangentially into the reactor and thereafter flows in a direction generally parallel to said source.

7. The method of claim 1 including the step of subjecting said waste stream with said contaminants and ozone therein to ultraviolet radiation having a wavelength in the range of about 254 nanometers.

8. The method of claim 1 including the step of providing a second reactor having a layer of sintered particulate anatase titanium dioxide deposited on an interior connected in series with said first-mentioned reactor, passing said waste stream with said contaminants and ozone therein into said second reactor including a longitudinally extending source of ultraviolet radiation having a wavelength in the range of about 254 nanometers, and subjecting said waste stream with said contaminants and ozone there to radiation from said radiation source of said second reactor.

* * * * *